United States Patent [19]

Chatlien

[11] 4,189,852
[45] Feb. 26, 1980

[54] METHOD OF TEACHING READING

[76] Inventor: Emilie M. Chatlien, 6653 N. Chicora Ave., Chicago, Ill. 60646

[21] Appl. No.: 805,742

[22] Filed: Jun. 13, 1977

[51] Int. Cl.² ............................................. G09B 5/00
[52] U.S. Cl. ..................................... 35/8 A; 35/35 C
[58] Field of Search ............................... 35/8 A, 35 C

[56] References Cited

U.S. PATENT DOCUMENTS

| | | | |
|---|---|---|---|
| 3,222,597 | 12/1965 | Beatenbough et al. | 35/8 A X |
| 3,279,098 | 10/1966 | Taylor | 35/35 C |
| 3,540,132 | 11/1970 | Glass et al. | 35/8 A |
| 3,550,289 | 12/1970 | Orita et al. | 35/35 C |
| 3,553,851 | 1/1971 | Paige | 35/8 A |
| 3,579,855 | 5/1971 | Worthy et al. | 35/8 A |
| 3,583,729 | 6/1971 | DeGroot | 35/8 A X |
| 3,641,684 | 2/1972 | Paige | 35/8 A |
| 3,691,313 | 9/1972 | Kobayashi et al. | 35/8 A UX |
| 3,808,720 | 5/1974 | Smith | 35/8 A X |
| 3,905,128 | 9/1975 | Koizumi et al. | 35/8 A |
| 3,996,671 | 12/1976 | Foster | 35/8 A |

*Primary Examiner*—William H. Grieb
*Attorney, Agent, or Firm*—Wallenstein, Spangenberg, Hattis & Strampel

[57] ABSTRACT

A method of teaching reading, and a prerecorded tape or like unit for use therein are described. A student scans the printed words in a book while the words are simultaneously being audibly reproduced by a magnetic tape and heard by the student while he scans said words. The recorded material on said magnetic tape has a plurality of predetermined spaced audible signals which serve as an indication that he is to follow written or oral instructions which had been given at the start of the session and/or at the end of each of a plurality of the predetermined audible reproductions of words in said book. The audible signals are followed by audible instructions to the student to perform certain acts, which may be the same or different, and reflected by a written word or written statement by the student and responsive to said audible instructions. The student is provided with means for writing said word or written statement within given predetermined time periods after each of said plurality of audible instructions has been heard by said student.

7 Claims, 3 Drawing Figures

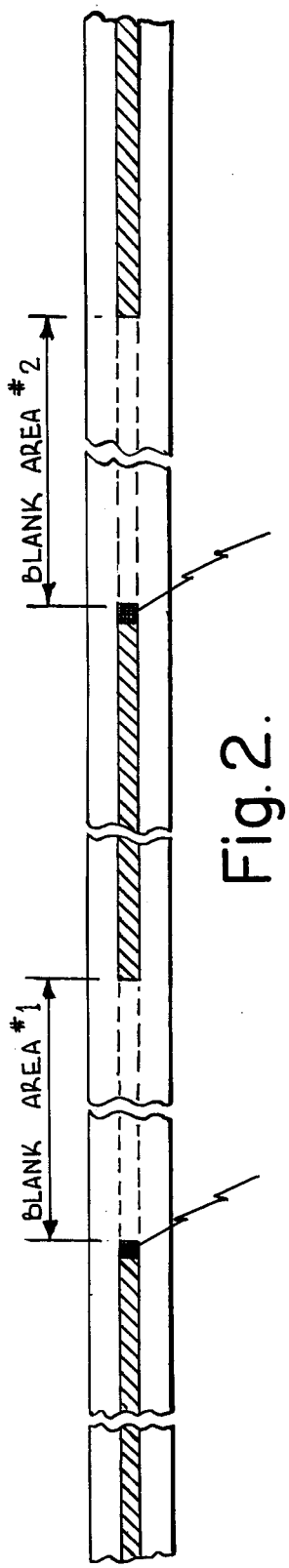
Fig. 2.
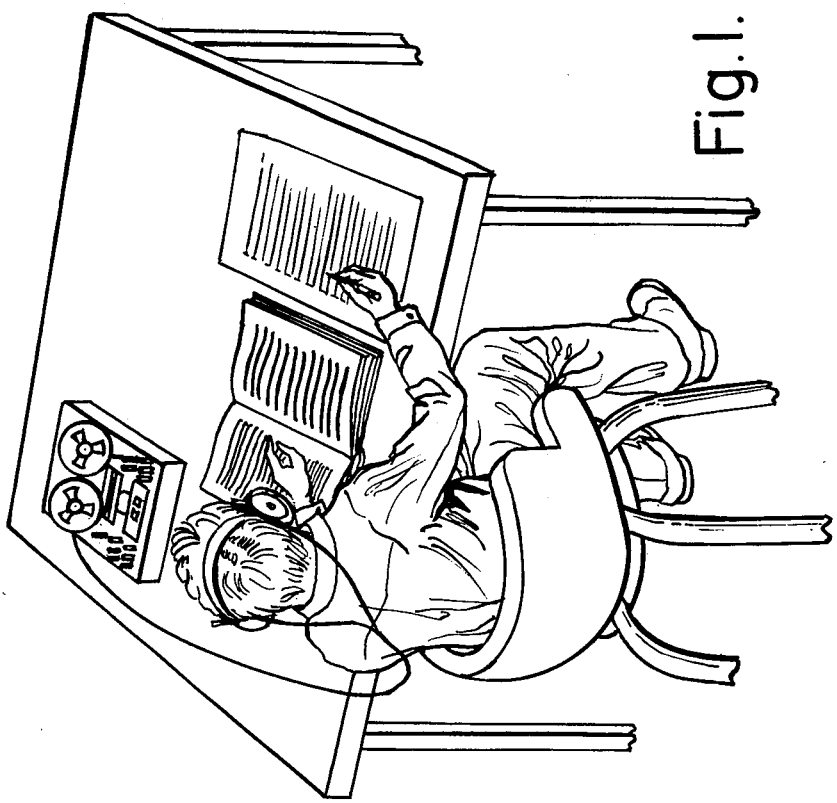
Fig. 3.
Fig. 1.

METHOD OF TEACHING READING

BACKGROUND AND PRIOR ART

It has heretofore been known to the art to teach reading to children and others by a number of different methods.

One heretofore known method of teaching reading is to project the words of a book or the like on a screen. This approach to teaching reading has numbers of deficiencies. Primarily, it is difficult for a student to be motivated to look at words moving even moderately rapidly across a screen. If he dislikes looking at words in books (which bear no meaning for him), he will not want to look at what are fundamentally meaningless words projected by film onto a screen.

Other long known methods of teaching reading are the so-called phonetic systems which resemble a jig-saw puzzle approach wherein the student must "sound out" a word. By the time that he has done this, he has commonly forgotten and/or lost interest in the material before him.

Other methods entrench a student in a milieu of failure. A person "used" to failure will not want to devote the patient application necessary in order to achieve success through reading methods which require long periods of time and arduous work.

Many methods simply are not enjoyable, in and of themselves. The enjoyment will come, the student is told, after he learns to read.

Months or years are required for a student to achieve mastery in reading through use of numbers of heretofore known methods. Most students today are geared for "instant results."

Perhaps the most successful of the heretofore known methods of teaching reading, although it involves significant inadequacies which, as will be shown below, are overcome by the present invention, is one in which the student is supposed to look at or scan the words in a book or the like containing written or printed words while they are simultaneously being read to the student, or audibly being reproduced from a previously recorded means, such as a record, or by a magnetic playback unit in the case of a magnetic tape or the like, and heard and followed by said student while he supposedly looks at or scans said words and in correlated relation thereto, a technique which combines sight word recognition with phonetics and proper pronunciation. This involves, worded otherwise, visual presentation of words, as in a book or the like, accompanied by an audio or sound presentation, as a result of which comprehension and retention of the material by the student is substantially increased. This approach to the teaching of reading commonly has been implemented by the use of audio recordings, in the form of records or magnetic tapes or the like, accompanied by a book or the like which is used in conjunction with said recordings, the audio presentation serving to provide the phonetic instruction and is keyed to the book or the like written words which provide the visual presentation. This type of method of teaching reading is disclosed, for instance, in U.S. Pat. Nos. 3,553,851; 3,583,729 and 3,641,684. The method just described, as indicated above, is, generally speaking, moderately effective.

It possesses the advantages that students tend to enjoy "reading" from the very first session, which is achieved through a combination of the following: the student is permitted to select his own reading material and his choice, therefore, tends to correspond to his established interests; the taped voice is predesigned to read in a dramatic manner, thus vivifying the written words of the book or the like which he is "reading"; from the very first session, the student is enabled to form a mental image of the material which he is "reading," and it is this capacity which, particularly, makes reading enjoyable; the student is, generally speaking, motivated to follow the written symbols with his eyes with the result that (a) his eyes naturally learn to move in the sweeping scansion required for proper reading as his eye movements are regulated through an induced following of the recorded voice, (b) he becomes familiar with the natural cadences of language as symbolized by grammatical syntax and, thus, he learns that a comma indicates a pause, a period indicates a lowering of the voice and a slight stop, etc., and (c) through a repeated induced association of the written symbol with the voiced word, the student soon becomes capable of reading simple words and, thus, by seeing and hearing the word "was" (or any other word) read over and over again, the student soon learns to recognize it on his own.

Other advantages of the foregoing known method of teaching reading are that, by hearing words read in context, the student is enabled to comprehend the meaning of many words which he would not be able to understand if encountered individually. The student tends to have a reasonably successful reading experience from his very first session with the recorded matter which is often a unique experience for him, as many of these students have become accustomed to failure in scholarly pursuits. The teacher generally has no difficulties with discipline, as the student tends to be fascinated by and enjoys the reading sessions, his attention being concentrated on the looking-listening procedure. The student tends not to learn to practice mistakes since what he sees and hears is correct, and he doesn't keep mistaking words over and over again. Finally, the cost to the public or other group which supports the school systems is reasonable since many, if not most, modern school systems, and/or school libraries are equipped with cassette players, earphones, etc.

Despite the foregoing advantages of said last-mentioned method of teaching reading, it possesses certain significant deficiencies the nature of which will be brought out below, and which the method of the present invention effectively overcomes.

Other heretofore known teaching systems lie largely in the realm of providing mechanical and electronic equipment, intended, commonly, to be operated by the student. Apart from the matter of the complexity and high cost of various of such equipment, most of it, generally speaking, is of a character such that it is not susceptible of easy usage, particularly by young children, and, as a practical proposition, it does not lend itself to meeting in a simple, easy and inexpensive way to the teaching of reading in ordinary classroom setups which are characteristic of what is encountered in the normal classroom in the usual schools. Illustrative of such mechanical and electronic equipment arrangements are, for instance, those shown in the aforementioned U.S. Patents as well as in U.S. Pat. Nos. 3,540,132; 3,579,855; 3,691,313; 3,808,720; 3,905,128 and 3,996,671.

As has been indicated above, there are significant inadequacies in the above-described method of teaching reading, which has been characterized above as being perhaps the most successful of the methods of teaching reading, namely, where the student is supposed to look at the words in a book, or is supposed to "read" the words, as they are being reproduced by an audio recording, as referred to above, keyed to the words in the book. Quite commonly, the students' attentions wander, they are diverted by other matters occurring in the class and there is no particular motivational factor which makes for the student having a special inducement to focus his attention on the scanning of the words of the book or the like with the audible sound which has been set up to correlate therewith. In short, the aforesaid known method of teaching reading does not have a motivation for the student to correlate the written and the sound words. He is able, simply, to follow the story or the like which is being read just by listening to it without looking at the words appearing in the book or the like which is before him. Indeed, if the classwork, after the audible reading has been finished, involves questions being asked of the student concerning what he has heard, he is in a position to answer such questions without even having looked at the words of the book or the like before him and, indeed, he may even have decided to concentrate on listening to the audible reading and disregard the words in the book or the like before him.

In accordance with the improved method of teaching reading pursuant to the present invention, motivational factors are incorporated so that the student has a special desire for achievement and tied in thereto are means to enable the teacher to determine whether or not the student has visually followed the audio presentation and so ascertain the progress, or lack of progress, that the individual student is making during the period of time in which he is being taught to read. Most students desire to achieve and to have that achievement concretely reflected by good grades evidenced by graded papers which reflect such achievement. The present invention provides that motivation for the students and also enables the teacher readily and simply to determine or monitor the progress of the individual students.

THE PRESENT INVENTION

The present invention effectively meets the foregoing inadequacy. This is accomplished in a very simple manner, coupled with techniques and procedures, as well as a magnetic tape or equivalent recording device having certain words, signals, instructions and blank spaces thereon, all as are described below, and which may perhaps best be followed and understood by reference to illustrative manners in which the improvements of the present invention are achieved. It will be understood that the illustrative procedures are by no means limiting since various adaptations can readily be evolved without departing from the fundamental teachings and guiding principles disclosed herein and embodied in said illustrative procedures.

BRIEF DESCRIPTION OF THE DRAWING

FIG. 1 shows a perspective view of the invention in use.

FIG. 2 shows a portion of the tape used in the invention.

FIG. 3 shows a sheet to receive a student's writing.

A method of teaching reading, and a prerecorded tape or like unit for use therein are described. A student scans the printed words in a book while the words are simultaneously being audibly reproduced by a magnetic tape and heard by the student while he scans said words. The recorded material on said magnetic tape has a plurality of predetermined spaced audible signals which serve as an indication that he is to follow written or oral instructions which had been given at the start of the session and/or at the end of each of a plurality of the predetermined audible reproductions of words in said book. The audible signals are followed by audible instructions to the student to perform certain acts, which may be the same or different, and reflected by a written word or written statement by the student and responsive to said audible instructions. The student is provided with means for writing said word or written statement within given predetermined time periods after each of said plurality of audible instructions has been heard by said student.

An individual student, or each student in a class of students, is provided with a conventional cassette player, or the like, a set of earphones, a sheet of paper, preferably of lined paper with numbered lines, say, for instance, from 1 to 10, and a pencil or pen. The student, or each student in a class of students, chooses any book (or other printed publication) of interest to him (or her) from among those which have been previously taped in the manner described below. The student then places the book of his choice before him, inserts the corresponding tape into the cassette, adjusts his earphones, and prepares to "read".

The material on the tape exactly duplicates the written material in the book which the student has selected but is modified in certain respects indicated below. He is to follow the written material with his eyes, while listening to the words being read to him on the tape. The tape which bears the words being read has, however, in its preparation, been provided with stops at fixed or predetermined intervals so that no words are being read over same predetermined intervals of time. The stopping of the taped voice reading, at the beginning of each such interval, is reflected or signaled by any convenient means, for example, by a "beep" sound or sounds or the like. At this signal, the student who has been given written or oral instructions at the start of the session, and/or is instructed, on the taped voice, to write the next word (which is not sounded by the tape but would have been read had the voice continued to read the material in the book, or other printed publication) on line number 1 or following the number 1 on the sheet of paper. After said taped instruction is given, a predetermined short time period is provided by the tape, during which no words or sounds are being played by the tape, to allot time for the writting of said next word by the student. At the end of said predetermined short time period, the taped voice then continues the reading from where it had left off, skipping the word which the student wrote or was requested to write. The next time the "beep" is heard, the student writes the next word which would have been read had the voice continued, on line number 2 or following the number 2 on the sheet of paper, and so on. An illustrative or a suggested time span for a single sitting in the course of this may be, for instance, 15, 20 or 25 minutes, or other time period as may be desired; and, in the course of such selected time period, the tape will have paused, say, 10 times, so that the student, at the close of the session, should have 10 words written on his numbered and lined or numbered paper.

The teacher is provided with an answer key, which lists the 10 words in correct order which the student should have on his paper. By assigning 10 points for each correct answer, a grade can quickly be accorded.

This makes for easy and rapid grading of the student's or students' completed paper or papers, and enables the teacher readily able to follow and monitor the progress which each student is making in learning to read and acquiring comprehension in reading.

As a student improves his reading ability through the use of the techniques and procedures illustratively described above, the method can be further modified in any of a number of ways. Thus, for instance, in the course of a reading session, a "beep" or equivalent signal could be followed by a written instruction and question, and/or by a direction on the tape, that a certain predetermined amount of reading material which is to follow is to be read quietly alone by the student and then a particular question is to be answered in relation thereto. In such a case, for instance, each "beep" or equivalent signal could be followed by a voiced statement on the tape or a written instruction such as "Now, read the next paragraph alone and answer Question 1." The taped voice would then pause or discontinue for a predetermined time interval reasonably long enough for the answer to be ascertained or thought out by the student and written down on a sheet of paper, previously furnished to the student or students, with similarly numbered lines, with numbers say from 1 to 10, each number bearing adjacent thereto a question relating to the material covered in each of the sequential "self-reading" sections involved. Again, as before, the taped voice would then continue reading orally until the next "beep" or equivalent signal was heard by the student or students. As the student or students progressed or became more proficient, the amount of material in the "self-reading" sections could be increased and the answers provided by the student or students. The papers would then be graded, as before, by the teacher.

Those students who were receiving lower graded papers could then readily be singled out and selected for additional attention and instruction to improve their reading and comprehension abilities.

From the foregoing description, it will thus be seen that my invention involves, in that method of teaching reading in which a student looks at or scans the words in a book or the like containing written or printed words while said words are simultaneously being audibly reproduced from a previously recorded means, such as a cassette tape, and followed by said student while he looks at or scans said words and in correlated relation thereto, the improvement which comprises providing in the recorded material on said audible recording means, such as a cassette tape means, a plurality of predetermined spaced audible or beep signals each at the end of the audible reproduction of a predetermined plurality of predetermined audible reproductions of a given number or sequence of words in said book or the like, each of said audible or beep signals being followed by audible and/or predetermined written instructions to said student to perform the same or different acts to be reflected by a written word or statement by said student responsive to said instructions, and providing said student with means for writing said word or statement within given predetermined time periods after each of said plurality of audible and/or written instructions has been heard by said student, each of said audible instructions being followed on said audible recording by a predetermined time period during which no sounds are being reproduced from said recorded means whereby students may uninterruptedly write said word or statement.

My invention fills a significant gap in previously known methods of teaching reading and brings about a definite improvement therein in that it provides important motivational factors for achievement by the student, and it enables the teacher simply and effectively to determine and follow the progress of each student and to make such adjustments as may be in order to overcome any deficiencies in the progress of a student, as well as to adapt the reading program to the particular advancement that a given student has made or is making in the reading program.

I claim:

1. In a method of teaching reading in which a student looks at or scans the words in a book or the like containing written or printed words while said words at least in the main are simultaneously being audibly reproduced from previously recorded audible recording means and heard by said student while he looks at or scans said words, the improvement which comprises providing the student with a book or the like having written or printed words, providing said student with means for writing words or statements, providing in the aforesaid recorded material on said audible recording means a plurality of predetermined spaced audible signals each at the end of each of a plurality of the predetermined audible reproductions of words in said book or the like, said audible signals being followed by audible or written instructions to said student to perform writing acts in relation to the audibly reproduced words on said audible recording means, said student, in following said instructions, writing on said means for writing words or statements a word or words or a statement or statements responsive to the aforesaid instructions previously given to said student within given predetermined time periods, after each of said plurality of instructions has been given to said student, whereby a writing is produced by said student which readily permits of being graded to enable the nature of the progress of the student in learning to read to be ascertained and evaluated by the teacher and the student.

2. The method of claim 1, in which the recording means is a cassette tape.

3. The method of claim 1, in which the means provided to the student for writing said word or statement is a paper or like sheet bearing numbers adjacent which said words or statements are to be written by the student or students for subsequent examination to determine the correctness or incorrectness thereof for grading or like evaluation purposes.

4. The method of claim 1, wherein the hearing by said student of said audibly reproduced words is through earphones worn by said student.

5. The method of claim 1, wherein said instructions given to the student are audible instructions on said tape.

6. The method of claim 1, wherein said instructions given to the student are provided in the form of written instructions.

7. In a method of teaching reading in which a student looks at or scans the words in a book or the like containing written or printed words while said words at least in the main are simultaneously being audible reproduced from previously recorded audible recording means and heard and followed by said student while he looks at or scans said words and in correlated relation thereto, the improvement which comprises providing the student with a book or the like having written or printed words, providing said student with means for writing words or statements, providing in the aforesaid recorded material on said audible recording means a plurality of predetermined spaced audible "beep" signals each at the end of the audible reproduction of a predetermined plurality of predetermined audible reproductions of a given number or sequence of words in said book or the like, said audible "beep" signals being followed by audible or written instructions to said student to perform writing acts in relation to the audibly reproduced words on said audible recording means, each of said instructions being followed on said audible recording means by a predetermined time period during which no sounds are being reproduced from said recording means, said student, in following said instructions, writing on said means for writing words or statements a word or words or a statement or statements responsive to the aforesaid instructions previously given to said student within each said predetermined time period, whereby a writing is produced by said student which readily permits of being graded to enable the nature of the progress of the student in learning to read to be ascertained and evaluated by the teacher and the student.

* * * * *